(12) United States Patent
Den Boestert et al.

(10) Patent No.: US 9,034,175 B2
(45) Date of Patent: May 19, 2015

(54) METHOD FOR REDUCING THE MERCURY CONTENT OF NATURAL GAS CONDENSATE AND NATURAL GAS PROCESSING PLANT

(75) Inventors: Johannes Leendert Willem Cornelis Den Boestert, Amsterdam (NL); Arian Nijmeijer, Amsterdam (NL); Cornelis Jacobus Smit, Amsterdam (NL)

(73) Assignee: Shell Oil Company, Houston, TX (US)

( * ) Notice: Subject to any disclaimer, the term of this patent is extended or adjusted under 35 U.S.C. 154(b) by 1283 days.

(21) Appl. No.: 12/532,960

(22) PCT Filed: Mar. 25, 2008

(86) PCT No.: PCT/EP2008/053490
§ 371 (c)(1),
(2), (4) Date: Feb. 19, 2010

(87) PCT Pub. No.: WO2008/116864
PCT Pub. Date: Oct. 2, 2008

(65) Prior Publication Data
US 2010/0147745 A1    Jun. 17, 2010

(30) Foreign Application Priority Data
Mar. 27, 2007 (EP) ...................................... 07104995

(51) Int. Cl.
*C10G 31/09* (2006.01)
*B01D 61/08* (2006.01)
(Continued)

(52) U.S. Cl.
CPC ................ *C10G 31/09* (2013.01); *B01D 61/08* (2013.01); *C10G 2300/1025* (2013.01); *C10G 2300/205* (2013.01); *B01D 61/027* (2013.01); *B01D 69/10* (2013.01); *B01D 71/70* (2013.01); *B01D 2257/602* (2013.01); *B01D 2311/04* (2013.01); *B01D 2311/06* (2013.01);
(Continued)

(58) Field of Classification Search
CPC ........................................................ C10G 31/09
USPC ................. 208/251 R; 210/348; 585/818
See application file for complete search history.

(56) References Cited

U.S. PATENT DOCUMENTS

| 4,966,684 A | 10/1990 | Audeh ....................... 208/251 H |
| 4,983,277 A | 1/1991 | Audeh et al. ................... 208/252 |

(Continued)

FOREIGN PATENT DOCUMENTS

| EP | 433 677 | * 6/1991 | ............. C10G 25/00 |
| EP | 511839 | 11/1992 | |

(Continued)

OTHER PUBLICATIONS

Natural Gas Condensate, Safety Data Sheet, ConocoPhillips. Apr. 2012. p. 7.*

(Continued)

*Primary Examiner* — Renee E Robinson
(74) *Attorney, Agent, or Firm* — Charles W. Stewart

(57) ABSTRACT

A method for reducing the mercury content of natural gas condensate, comprising the steps of providing a nanofiltration membrane having a feed side and a permeate side; contacting the natural gas condensate with the feed side of the membrane; and obtaining a mercury-depleted natural gas condensate at the permeate side of the membrane; and a natural gas processing plant comprising a condensate workup section including a nanofiltration membrane separation unit for reducing the mercury content of natural gas condensate.

17 Claims, 5 Drawing Sheets

(51) Int. Cl.
*B01D 61/02* (2006.01)
*B01D 69/10* (2006.01)
*B01D 71/70* (2006.01)
*C10G 31/11* (2006.01)
*C10G 55/04* (2006.01)

(52) U.S. Cl.
CPC ........ *B01D 2311/08* (2013.01); *B01D 2323/30* (2013.01); *B01D 2323/34* (2013.01); *C10G 31/11* (2013.01); *C10G 55/04* (2013.01)

(56) References Cited

U.S. PATENT DOCUMENTS

| | | | |
|---|---|---|---|
| 5,093,002 A | 3/1992 | Pasternak | 210/500.27 |
| 5,102,551 A | 4/1992 | Pasternak | 210/651 |
| 5,133,851 A * | 7/1992 | Bitter et al. | 208/251 R |
| 5,150,118 A | 9/1992 | Finkle et al. | 341/23 |
| 5,275,726 A | 1/1994 | Feimer et al. | 210/321.74 |
| 5,458,774 A | 10/1995 | Mannapperuma | 210/321.83 |
| 5,725,767 A | 3/1998 | Culkin | 210/321.75 |
| 6,013,852 A * | 1/2000 | Chandrasekharan et al. | 585/648 |
| 6,268,543 B1 | 7/2001 | Sakai et al. | 585/836 |
| 6,350,372 B1 | 2/2002 | Degnan et al. | 208/251 R |

FOREIGN PATENT DOCUMENTS

| | | | |
|---|---|---|---|
| EP | 1424124 | 6/2004 | B01D 67/00 |
| GB | 2406294 | 3/2005 | |
| WO | WO9600607 | 1/1996 | B01D 53/64 |
| WO | WO9627430 | 9/1996 | B01D 71/70 |
| WO | WO9927036 | 6/1999 | C10G 55/04 |
| WO | WO0069991 | 11/2000 | |
| WO | WO0162870 | 8/2001 | C10G 25/00 |
| WO | WO03035803 | 5/2003 | C10G 31/11 |
| WO | WO2004092308 | 10/2004 | C10G 31/11 |
| WO | WO2005002701 | 1/2005 | |
| WO | WO 2006/040328 * | 4/2006 | C10M 105/04 |

OTHER PUBLICATIONS

Encyclopedia of Chemical Engineering, 4$^{th}$ Ed., 1995, John Wiley & Sons Inc., vol. 16, pp. 158-164.

* cited by examiner

METHOD FOR REDUCING THE MERCURY CONTENT OF NATURAL GAS CONDENSATE AND NATURAL GAS PROCESSING PLANT

PRIORITY CLAIM

The present application claims priority of European Patent Application No. 07104995.1 filed 27 Mar. 2007.

FIELD OF THE INVENTION

The present invention relates to a method for reducing the mercury content of natural gas condensate and to a natural gas processing plant.

BACKGROUND OF THE INVENTION

Mercury is commonly present in natural gas streams that are produced from an underground formation through a well to surface.

The well fluid is typically split into several liquid and gaseous streams in a natural gas production facility. An initial separation into water, liquid natural gas condensate and gaseous components is typically done in an upstream slug catcher and/or one or more upstream separators, and the various streams are subsequently purified, further separated and/or treated to reach certain specifications.

Removal of mercury from gaseous and also liquid streams from natural gas processing is needed for various reasons. If Hg is not removed at the source, it would end up in products from natural gas such as in Liquified Petroleum Gas (LPG), and after combustion thereof in the environment. Also for this reason, Hg specifications are applicable for various streams dealt with in natural gas processing. There is a price penalty for high Hg concentrations in traded products. Furthermore, Hg removal is often a technical necessity in order to maintain the integrity of downstream equipment. Mercury components can damage metal components, particularly vulnerable for corrosion by Hg are aluminium and aluminium alloy components of processing equipment, such as of a cracker processing natural gas condensate.

In the gas treating section of natural gas processing plant typically an adsorption process is used for mercury removal, in particular adsorption on an activated carbon bed. Such a process cannot be used efficiently for a liquid feedstock such as condensate, especially when asphaltenic material is present as they will choke the adsorption bed.

In liquid condensate, also referred to as Natural Gas Liquid (NGL), mercury can be present in various constitutions, e.g. metallic, ionic, alkyl mercury. It is assumed that these are normally dissolved in atomic, ionic or molecular form, although it cannot be excluded that supramolecular clusters, micro-droplets or the like are formed. These constituents are for example found in sweet condensate, i.e. natural gas condensate that is substantially free of sulphur compounds. In an acidic environment, such as a sour condensate containing substantial amounts of sulphur compounds, such as 500 ppmw S (parts per million by weight), mercury is also or predominantly present as mercury sulphide, which forms solid particulates. Sulphur compounds can in particular be or include $H_2S$.

Known methods for removal of mercury from natural gas condensate often comprise a step of forming mercury sulphide particles, followed by absorption or filtration thereof. Such methods are for example discussed in U.S. Pat. Nos. 4,966,684 and 6,350,372.

U.S. Pat. No. 6,268,543 discusses other adsorbent and extraction methods for mercury removal, and discloses a removal method wherein condensate is contacted with water and sludge, both of which have been contacted in advance with crude oil.

There is a need for an improved process to remove mercury contaminants from natural gas condensate, and for an improved natural gas processing plant.

SUMMARY OF THE INVENTION

To this end there is provided a method for reducing the mercury content of natural gas condensate, comprising the steps of
providing a nanofiltration membrane having a feed side and a permeate side;
contacting the natural gas condensate with the feed side of the membrane; and
obtaining a mercury-depleted natural gas condensate at the permeate side of the membrane.

The invention is based on the insight gained by Applicant that a nanofiltration membrane can be effective to block various types of mercury, i.e. both microscopic/molecular species (e.g. metallic, ionic, alkyl) in dissolved or entrained form as well as solid particulates (e.g., HgS), so that an effective mercury removal from natural gas process streams, in particular from natural gas condensate, is possible.

Suitably, the nanofiltration membrane is one of a polymeric or a ceramic nanofiltration membrane, and in particular comprises a polysiloxane layer, more in particular a cross-linked polysiloxane layer. The latter type has proven to be particularly efficient in removing different types of mercury.

Preferably at least one of the group of mercury components is essentially completely removed from the natural gas condensate, which group consists of metallic mercury, ionic mercury, alkyl mercury, mercury sulphide, more preferably the entire group of components is essentially completely removed.

When a mercury component or group of components is essentially completely removed from a stream, such as from the natural gas condensate, the resulting stream typically has a mercury content of that component or group of components of 100 ppbw (parts per billion by weight) or less, suitably of 25 ppbw or less, preferably of 5 ppbw or less, more preferably of 2 ppbw or less, most preferably of 1 ppbw or less. Essentially complete removal can also be defined in relative terms, suitably at least 80 wt % of the mercury component or group of components is removed, preferably at least 90 wt %, more preferably at least 95 wt %, most preferably at least 99 wt %.

At a downstream end of the feed side of the nanofiltration membrane a mercury-enriched retentate is obtained. In a particularly advantageous embodiment the nanofiltration membrane is arranged in a membrane separation unit of a condensate workup section in a gas processing plant, and the retentate is recycled to the inlet of a gas/liquid separator upstream of the membrane separation unit. Mercury components that have been blocked by the membrane can in this way be directed into the natural gas stream. The natural gas processing plant suitably comprises a gas treating section including a mercury removal unit. This can for example be a low temperature separator provided with a mercury draw-off unit. In this way, mercury from both gaseous and condensate streams in the natural gas processing plant can be removed at one point.

The invention further provides a natural gas processing plant for carrying out the process of the invention, comprising a condensate workup section including a nanofiltration membrane separation unit for reducing the mercury content of natural gas condensate. The nanofiltration membrane separation unit comprises a nanofiltration membrane and has an inlet for natural gas condensate at a feed side of the membrane, and outlet for mercury-depleted condensate at a permeate side of the membrane, an outlet for mercury-enriched retentate at the feed side of the membrane.

BRIEF DESCRIPTION OF THE DRAWINGS

An embodiment of the invention will now be described in more detail and with reference to the accompanying drawings, wherein.

Where the same reference numerals are used in different Figures, they refer to the same or similar objects.

DETAILED DESCRIPTION OF THE INVENTION

Figure 1:
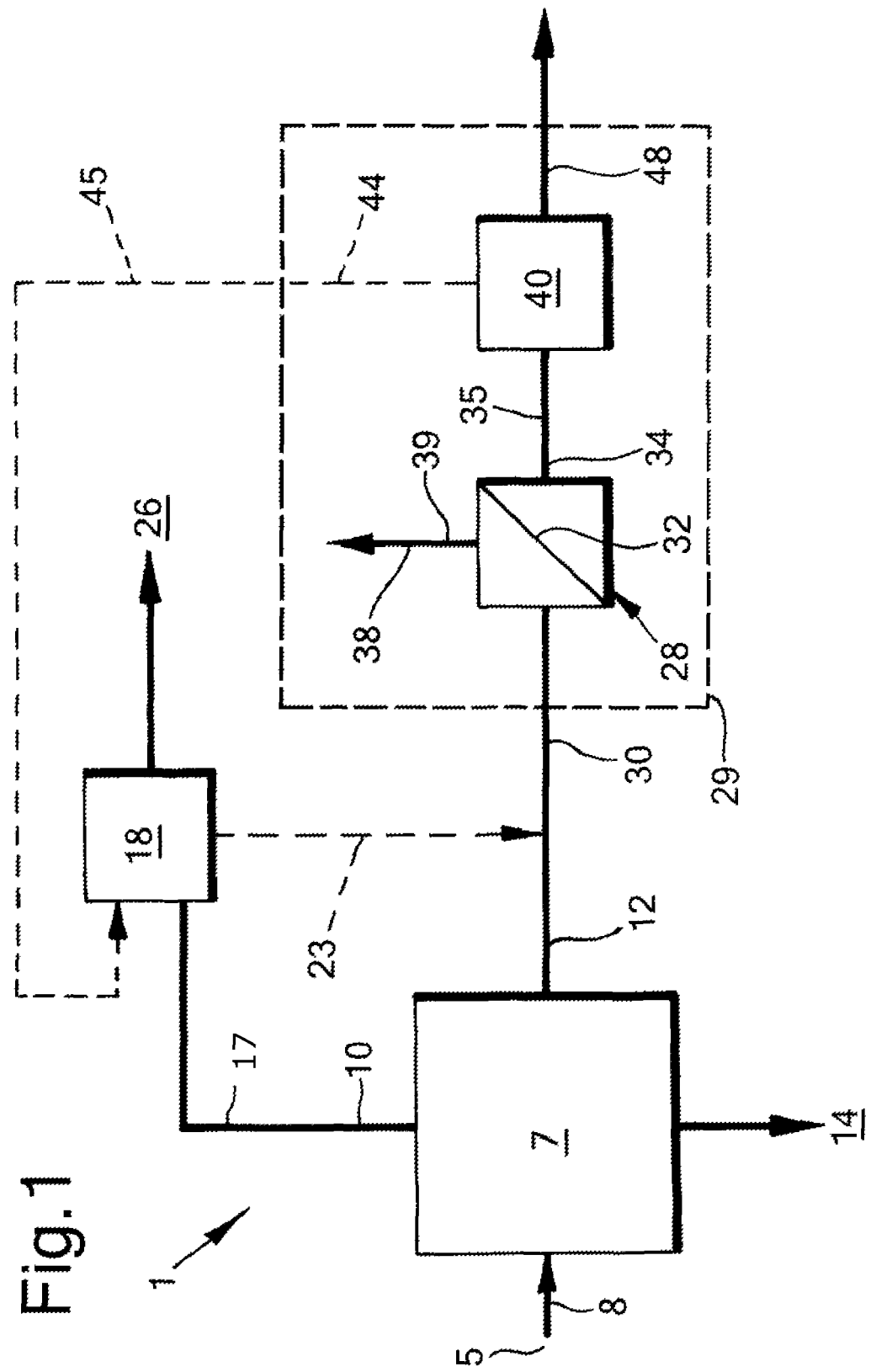
FIG. 1 shows schematically an embodiment of the invention.

Reference is made to FIG. 1, showing a schematic high-level overview of a natural gas processing plant 1 according to the invention. The natural gas fluid stream 5 from a producing well (not shown) contains mercury.

An inlet separation system 7 is arranged to receive the natural gas fluid stream 5 via inlet line 8. The fluid stream 5 typically comprises gas, liquid hydrocarbons and water. Liquid hydrocarbons contained in a natural gas stream are commonly referred to as condensate. It will be understood that the phase constitution of the inlet stream depends on the source and on the prevailing conditions, in particular temperature and pressure.

The inlet system 7 is arranged to separate the fluid stream 5 into a gas stream 10, a condensate stream 12, and a water stream 14. The inlet system typically comprises an inlet slug catcher and/or one or more two- or three-phase separators.

The plant comprises a gas treating system for the gas stream 10 in line 17, generally indicated with reference numeral 18. The gas treating system 18 can take different forms and include various processing units for e.g. acid gas removal, dehydration, contaminants adsorption, desulphurization etc. In many cases the gas treating system includes a further gas/liquid separator, such as a Low-Temperature Separator (LTS), the liquid outlet stream of which separator is a condensate. Such condensate is suitably combined with the condensate stream 14 obtained from inlet separation, and this option is indicated by dotted line 23. Treated gas 26 is obtained downstream of the gas treating system 18.

In accordance with the invention, a membrane separation unit 28 is used in the condensate workup section 29 in order to reduce the mercury content. In the embodiment shown, the membrane separation unit 28 is arranged upstream from a condensate stabilizer section 40 for condensate. Optionally the membrane separation unit 28 may also be arranged downstream from the condensate stabilizer section 40. The membrane unit has an inlet for condensate feed via line 30, a nanofiltration membrane 32, an outlet for permeate 34 (mercury-depleted condensate) to line 35 to the stabilizer section 40 and an outlet 38 for retentate 39. In this embodiment, the membrane unit is so arranged that the condensate feed flows over the feed side of the membrane, and the outlet 38 for retentate is arranged at a downstream end of the feed side. From the condensate stabilizer section typically a further gaseous stream 44 is generated, which can be passed via line 45 to the gas treatment unit 18. Since the condensate stabilizer section 40 is arranged downstream from the membrane unit 28, the gas is mercury depleted.

It is optionally possible to arrange the membrane separation unit 28 downstream of the stabilizer section. If in this case a mercury removal unit forms part of the gas treating section 18, the mercury in the gas sent via line 45 is removed in the gas treating section.

During normal operation, a natural gas fluid stream 5 is received via line 8 in the inlet separation system 7. Mainly depending on the natural gas source, the Hg concentration in the fluid stream 5 can be as low as 10 ng/Nm$^3$ or lower, and is in many cases in the order of 10-300 ng/Nm$^3$, such as 30-50 or 150-250 μg/Nm$^3$. In extreme cases the concentration can reach and even exceed 1000 μg/Nm$^3$. (Nm$^3$ means normal cubic meters.) In the inlet separation system the stream 5 is separated into gas 10, condensate 12 and water 14 streams. The condensate stream 12 constitutes typically between 0 and 50 mol % of the inlet fluid stream and typically contains in the order of 1-500 ppbw (μg/kg) of Hg, but sometimes even more, in extreme cases even in the ppmw range such as up to 1 or even up to 5 ppmw. The gas 10 is sent via line 17 to gas treating system 18, to obtain treated gas 26. Treated gas 26 is sent to downstream transport or processing, e.g. to a pipeline, a Liquefied Natural Gas (LNG) plant, or a Gas-to-Liquids (GTL) plant. Further condensate separated from the gas stream can be combined with the condensate 12 via line 23. The condensate processed by the present method can have an ASTM colour of less than 3, or less than 2, as determined with ASTM D1500.

Condensate is passed via line 30 to the membrane separation unit 28, where it is contacted with the feed side of the nanofiltration membrane 32, to obtain mercury-depleted condensate 34 at the permeate side of the membrane, and a retentate stream 39. The mercury-depleted condensate is sent to condensate stabilizer section 40, to obtain stabilized condensate 48. A gaseous stream 44 obtained from the condensate stabilizer section can be sent to the gas treating system 18.

The membrane 32 is a so-called nano-filtration (NF) membrane, which expression is also to include so-called reserve osmosis type membranes, dense membranes, and nanoporous membranes. Nanofiltration is a pressure-driven membrane-based separation process in which particles and dissolved molecules smaller than about 2 nm are rejected from passing through the nanofiltration membrane. The separation mechanism can depend on the differences in solubility and diffusivity (dense membranes) or molecular size exclusion (nanoporous membranes). A pressure differential over the membrane (trans-membrane pressure) is used as a driving force to enhance transport through the membrane barrier.

The membrane may be of a ceramic type or a polymeric type. Suitable nanofiltration membranes have a Molecular Weight Cut Off (MWCO) of 2000 Da or less (Da=Dalton; g/mol), preferably 1000 Da or less, and even more preferred 500 Da or less. The advantage of said ceramic type membranes is that they do not have to swell in order to work under optimal conditions. This is especially advantageous when the feed stream does not contain substantial amounts (10 wt % or more) of aromatic compounds. Examples of ceramic types are mesoporous titania, mesoporous gamma-alumina, mesoporous zirconia and mesoporous silica.

Preferably, the membrane used is hydrophobic because the stream to be treated is a hydrocarbon stream, which should be capable of passing through the membrane. An additional advantage of using a hydrophobic membrane rather than a hydrophilic one, is that using a hydrophobic membrane will prevent water from passing the membrane and entering the permeate.

Non-porous nanofiltration membranes are sometimes referred to in the art as dense membranes. Examples of non-porous nanofiltration membranes are reverse osmosis type membranes. Non-porous nanofiltration membranes should be distinguished from ultrafiltration membranes which are always porous. Ultrafiltration membranes typically have an average pore size of greater than 5 nm up to about 800 nm. Where nanofiltration membranes are used which are porous, they generally have an average membrane pore size which is at most 3 nm (nanoporous membranes). Where such nanoporous nanofiltration membrane is used in accordance with the present invention, the average membrane pore size is suitably less than 3 nm, preferably at most 2 nm, more preferably at most 1 nm, more preferably at most 0.7 nm, more preferably at most 0.5 nm.

In a preferred embodiment of the present invention, the nanofiltration membrane is a polymeric membrane. Such polymeric membrane is preferably cross-linked to provide the necessary nanofiltration properties. In general, cross-linking can be effected in several ways, for instance by reaction with cross-linking agents (chemical cross-linking) and/or by irradiation. Preferably, the membrane layer has a siloxane structure which has been cross-linked by means of irradiation, as is for example described in WO-A-9627430.

Examples of suitable, presently available cross-linked nanofiltration membranes are cross-linked silicone rubber-based membranes, of which the cross-linked polysiloxane membranes are a particularly useful group of membranes. Such cross-linked polysiloxane membranes are known in the art, for example from U.S. Pat. No. 5,102,551.

Typically, the polysiloxanes used contain the repeating unit —Si—O—, wherein the silicon atoms bear hydrogen or a hydrocarbon group. Preferably the repeating units are of the formula (I)

—Si(R)(R')—O—   (I)

wherein R and R' may be the same or different and represent hydrogen or a hydrocarbon group selected from the group consisting of alkyl, aralkyl, cycloalkyl, aryl, and alkaryl. Preferably, at least one of the groups R and R' is an alkyl group, and most preferably both groups are alkyl groups, more especially methyl groups. Very suitable polysiloxanes for the purpose of the present invention are (—OH or —NH$_2$ terminated) polydimethyl-siloxanes and polyoctylmethylsiloxanes. Thus, preferably, the polysiloxane is cross-linked. The cross-linking may be effected through a reactive terminal —OH or —NH$_2$ group of the polysiloxane. Preferred polysiloxane membranes are cross-linked elastomeric polysiloxane membranes.

Examples of suitable cross-linked elastomeric polysiloxane membranes are extensively described in above-mentioned U.S. Pat. No. 5,102,551. Thus, suitable membranes are composed of a polysiloxane polymer such as described hereinbefore, having a molecular weight of 550 to 150,000, preferably 550 to 4200 (prior to cross-linking), which is cross-linked with, as cross-linking agent, (i) a polyisocyanate, or (ii) a poly(carbonyl chloride) or (iii) R$_{4-a}$Si(A)$_a$ wherein A is —OH, —NH$_2$, —OR, or —OOCR, a is 2, 3, or 4, and R is hydrogen, alkyl, aryl, cycloalkyl, alkaryl, or aralkyl. Further details regarding suitable polysiloxane membranes can be found in U.S. Pat. No. 5,102,551.

For the purpose of the present invention the preferred nanofiltration membrane is a polydimethylsiloxane membrane, which is preferably cross-linked, and non-porous. Also other rubbery non-porous membranes can be used. In general, rubbery membranes can be defined as membranes having a non-porous top layer of one polymer or a combination of polymers, of which at least one polymer has a glass transition temperature well below the operating temperature, i.e. the temperature at which the actual separation takes place. Yet another group of potentially suitable non-porous membranes are the so called superglassy polymers. An example of such a material is poly(trimethylsilylpropyne).

The nanofiltration membrane is typically supported on at least one porous substrate layer to provide the necessary mechanical strength. Suitably, this other porous substrate layer is made of a porous material of which the pores have an average size greater than 5 nm. Such other porous material may be a microporous, mesoporous or macroporous material which is normally used for microfiltration or ultrafiltration, such as poly(acrylonitrile). The thickness of the base layer should be sufficient to provide the necessary mechanical strength. In addition, this substrate may in return be supported on a further porous support to provide the required mechanical strength. Typically, the thickness of the base layer is of from 100 to 250 μm, more suitably of from 20 to 150 μm. Where the nanofiltration membrane is combined with such base layer, the membrane suitably has a thickness of from 0.1 to 15 μm, preferably of from 0.5 to 5 μm.

The combination of a thin top membrane layer and a thick porous support layer is often referred to as composite membranes or thin film composites. The membrane is suitably so arranged that the permeate flows first through the membrane top layer and then through the base layer, so that the pressure difference over the membrane pushes the top layer onto the base layer. Suitable porous materials for the base layer having an average pore size greater than 5 nm, are poly(acrylonitrile), poly-(amideimide)+TiO$_2$, poly(etherimide), polyvinylidene-difluoride and poly(tetrafluoroethylene), polyaramide. Poly(acrylonitrile) is especially preferred. A preferred combination according to the present invention is a poly(dimethylsiloxane)-poly(acrylonitrile) combination.

Suitable composite membranes which can be used in the process of the present invention, can for example be obtained from GMT Membrantechnik GmbH (a company having its principal office in Rheinfelden, Germany) and from Solsep B.V. (a company having its principal office in Apeldoorn, Netherlands).

The non-porous or nanofiltration membrane may also be used without a substrate layer, but it will be understood that in such a case the thickness of the membrane should be sufficient to withstand the pressures applied. A thickness greater than 10 μm may then be required. This is not preferred from a process economics viewpoint, as such thick membrane will significantly limit the throughput of the membrane, thereby decreasing the amount of purified product which can be recovered per unit of time and membrane area.

In case a non-porous or dense membrane is used, transmission of the permeate is assumed to take place via the solution-diffusion mechanism. The condensate to be permeated dissolves in the membrane matrix and diffuses through the thin selective membrane layer, after which it desorbs at the permeate side. The main driving force for permeation is hydrostatic pressure. Examples of such membranes are reverse osmosis type membranes. In case a nanoporous membrane is used in the present invention, it is believed that separation takes place both on the basis of the above-mentioned solution-diffusion mechanism and on the basis of molecular size differences. In the latter case, there is no question of dissolution of the permeate in the membrane matrix but only of transport through the membrane via its nanopores. Where such solution-diffusion mechanism is functioning, it is believed to be important that the membrane material does not dissolve the contaminant to be removed from the membrane feed but, preferentially, only the component that has to be freed from the contaminant. In the course of the present invention it was found that especially polysiloxane membranes, for example poly(dimethylsiloxane) membranes, are capable of such preferential dissolution of natural gas condensate, rather than mercury components.

An advantage of using non-porous membranes as compared to the use of nanoporous membranes is that there is no plugging effect. This means that there is no possibility of the membrane becoming blocked by larger molecules plugged in the pores. This could happen in porous membranes, as a result of which it is more difficult to regenerate a stable flux. Therefore, it is preferred for the purpose of the present invention to use a non-porous or dense membrane. However, it is emphasised that nanoporous membranes could also be used in the process of the present invention as a nanofiltration membrane.

The permeate obtained with the present process has been upgraded in the sense that its mercury contamination level has been lowered. Consequently the permeate has obtained a higher value compared to the original product. The retentate, which contains an increased proportion of mercury components as compared to the original condensate, has a value depending on the mercury concentration and the perceived end use. The retentate value may be lower than or similar to the value of the original feed.

The present invention can be applied in parallel-operated (groups of) membrane separators comprising a single separation step, or also in embodiments comprising two or more sequential separation steps, wherein the retentate of a first separation step is used as the feed for a second separation step.

The membrane separation will be performed in a membrane separation unit, which comprises one or more membrane modules. Examples of suitable modules are typically expressed in how the membrane is positioned in such a module. Examples of these modules are the spirally wound, plate and frame, hollow fibres and tubular modules. Preferred module configurations are spirally wound and plate and frame. Spirally wound is most preferred when a dense membrane is used. These membrane modules are well known to the skilled person as for example described in Encyclopedia of Chemical Engineering, $4^{th}$ Ed., 1995, John Wiley & Sons Inc., Vol 16, pages 158-164. Examples of spirally wound modules are described in for example, U.S. Pat. No. 5,102,551, U.S. Pat. No. 5,093,002, U.S. Pat. No. 5,275,726, U.S. Pat. No. 5,458,774 and U.S. Pat. No. 5,150,118.

Stage cut is defined as the weight percentage of the original feed that passes through the membrane and is recovered as permeate. By adjusting the stage cut, it is possible to vary the concentration of a contaminant in the permeate, as well as the concentration of the contaminant in the retentate. The higher the stage cut, the higher the contaminant concentration in the retentate.

In the present invention, the stage cut can vary within broad limits: 10 to 99% by weight, suitably 20 to 95% by weight, in particular 30 to 90% by weight, more in particular 30-70% by weight. The stage cut is selected such that a mercury concentration in permeate and/or retentate is achieved which is below a certain desirable maximum.

The desired stage cut can be set by varying, for a given permeability of the membrane, the trans-membrane pressure and/or the feed flow. The first option implies that, for a given feed flow, increasing the trans-membrane pressure results in a greater flux or flow of the permeate through the membrane, and therefore in a higher stage cut. According to the second option, such higher stage cut may also be achieved by decreasing the feed flow whilst maintaining a certain permeate flow through the membrane.

In the present invention, the permeate flux through the membrane expressed as volume flux is typically in the range of from 4 to 1000, suitably 5 to 500, and more suitably 10 to 200 $l/h/m^2$. The flux through the membrane may also be expressed as mass flux, a suitable mass flux range is between 100 and 4000 $kg/m^2$ membrane area per day. Preferably, the flux through the membrane is constant in time. Further, the inlet stream is contacted with the membrane at a trans-membrane pressure (pressure difference), which is typically in the range of from 1 to 60 bar, suitably 3 to 35 bar, and more suitably 3 to 30 bar, in particular 5 to 25 bar, more in particular 15-25 bar (1 bar=$10^5$ Pa). At such trans-membrane pressure the above permeate fluxes can be achieved. The permeability of the membrane is typically in the range of from 1 to 100, suitably 2 to 50, and more suitably 3 to 10 $l/h/m^2/bar$.

The membrane separation is suitably carried out at ambient temperature unless there is a deposition of heavy paraffins that requires heating. In this case, separation may be suitably carried out at a temperature up to 100° C., in particular 10 to 100° C., and suitably in the range of 15-85° C. From an operational point of view it can be preferred to operate at ambient temperature. In the case of the presence of significant amounts of paraffins in the condensate, such as at 1 wt % or more, in particular 5 wt % or more, operation at somewhat elevated temperatures such as between 35 and 65° C. can be preferred in order to prevent precipitation of the higher paraffins (such as waxes) on the membrane surface. Such precipitation would hinder the permeation process and result in a flux decline. The feed flux over the membrane is preferably between 100 and 4000 $kg/m^2$ membrane area per day.

Preferably the membrane separation is performed as a continuous process wherein feed is passed over the membrane due to a pressure difference such to obtain a mercury-depleted permeate. Part of the feed, the retentate comprising the mercury, will not pass the membrane. The retentate will be discharged from the unit. The mass ratio between permeate and retentate is between 1 and 20 and suitably between 5 and 10. Preferably the local velocities of the feed at the retentate side of the membrane are such that a turbulent flow regime exists.

A turbulent flow regime will facilitate that the mercury components, and other contaminants such as e.g. asphaltenes, remain in the retentate or is re-dissolved from the membrane into the retentate. Preferably the local velocities may be increased deliberately by for example vibration or rotation of the membrane. Examples of such processes are described in EP-A-1424124 and U.S. Pat. No. 5,725,767.

The retentate which still is largely condensate with increased mercury concentration may suitably be recycled to the membrane separation step and mixed with fresh feedstock to the membrane separation unit. However, when recycling retentate, part of the retentate will have to be discharged such as to avoid build up of the mercury components that are to be separated from the condensate. The average cross-flow velocity of the feed over the feed side of the membrane is preferably in the range of from 0.1 to 5 m/s, preferably 0.8 to 1.5 m/s. The cross-flow can be adjusted by recirculating a suitable part of the retentate to the inlet of the membrane separation unit.

Instead of recycling the retentate within the same process, it may also be subjected to a second and optionally further separation step, in which case the retentate of a first separation step is used as the feed for a second separation step.

Further, instead of recycling (part of) the retentate or further purifying it in a second and optionally further step, the retentate may also be discharged in its entirety. This is most likely advantageous where the composition of the retentate is such that it has some value as a starting material in another process, without having to further treat the retentate before such use (no further processing).

Although a continuous process is preferred and achievable, in some instances it may be desirable to clean the membrane at certain intervals for optimum performance. For example it may be advantageous to regularly flush the membranes at their retentate side with a solvent. A suitable solvent may be the permeate itself. Such flushing operations are common in membrane process operations and are referred to as conventional cleaning in place (CIP) operations. In such operations a membrane unit may be cleaned while other parallel oriented membrane units continue to perform the desired separation process and operate without flushing. Other methods to remove fouling from the feed side of the membrane are for example the temporary lowering of the trans-membrane pressure, such as by lowering the pressure at the feed side or by closing the outlet from the permeate side so that the trans-membrane pressure is significantly lowered. Such methods are described in International patent applications with publication Numbers WO 03/035803 and WO 2004/092308.

Figure 2:
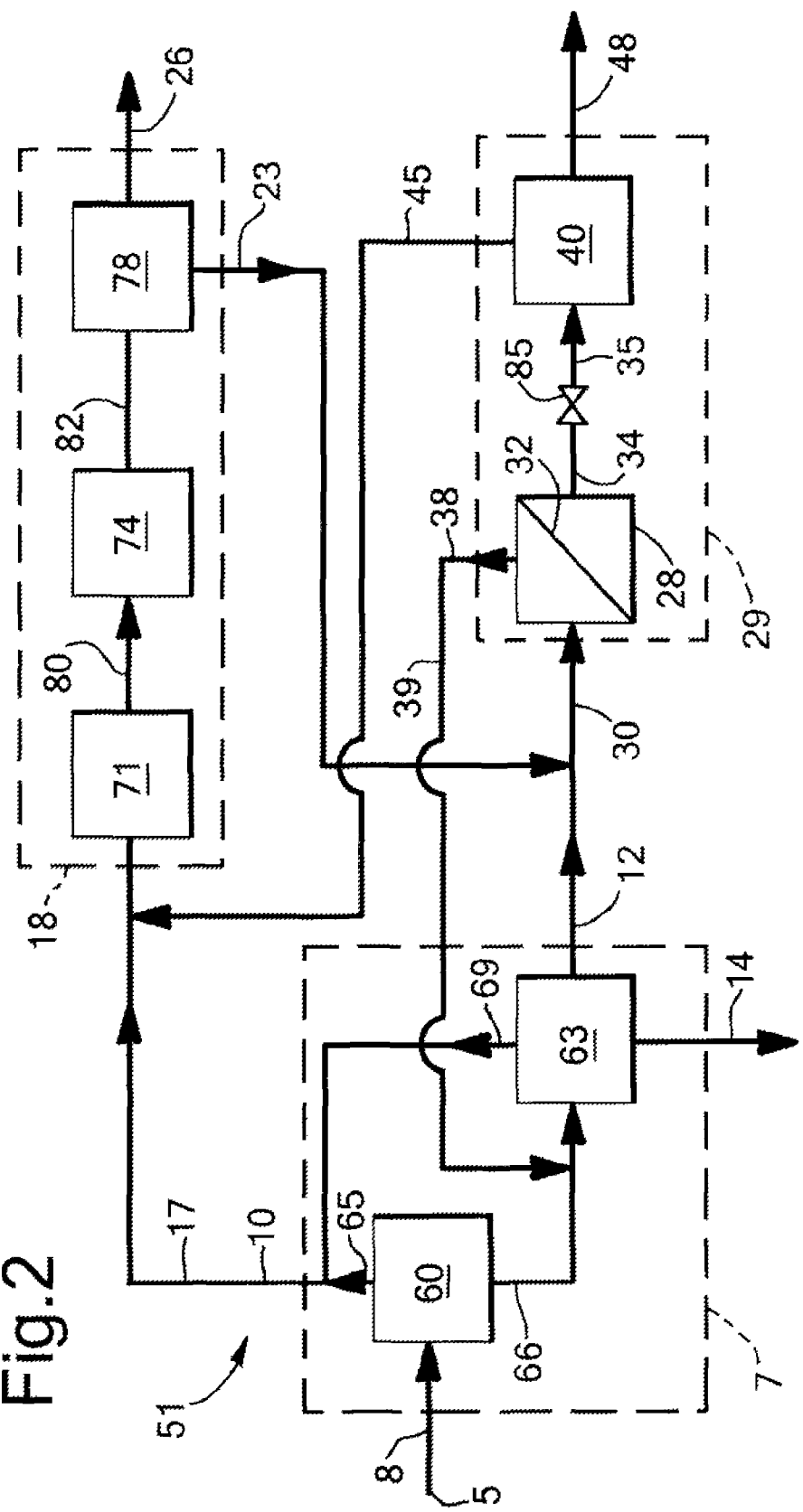
FIG. 2 shows schematically a more detailed embodiment of the invention.

Reference is now made to FIG. 2 showing a more detailed embodiment than FIG. 1 of a plant 51 according to the invention. Like reference numerals as in FIG. 1 are used to designate the same or similar objects, and in this regard reference is made to the discussion with reference to FIG. 1. In the following we will focus the discussion of differences and extensions from FIG. 1.

The inlet separation system 7 is shown here as a combination of a slug catcher 60 and a three-phase inlet separator 63. The slug catcher as shown provides a pre-separation into gas 65 and predominantly liquid components 66, which predominantly liquid components are fed to the three-phase separator 63 from which condensate 12, water 14 and a gaseous stream 69 is obtained, which gaseous stream 69 is combined with gas 65 to form stream 10. Clearly, other configurations of an inlet separation system are also possible, such as a two- or three-phase separating slug catcher combined with one or more 2- or three-phase separators.

The gas treating system 18 of this embodiment includes an Acid Gas Removal Unit (AGRU) 71, a Glycol Dryer Unit (GDU) 74, and a Low Temperature Separator (LTS) 78, and are all known in the art. The AGRS 71 may not be present in case of a sweet gas. The glycol dryer 74 receives low-acid gas from line 80 and removes traces of water from the gas stream. The LTS 78 serves for dewpointing of the dry gas received from line 82 and removal of glycol, and a further condensate stream is obtained.

Figure 3:
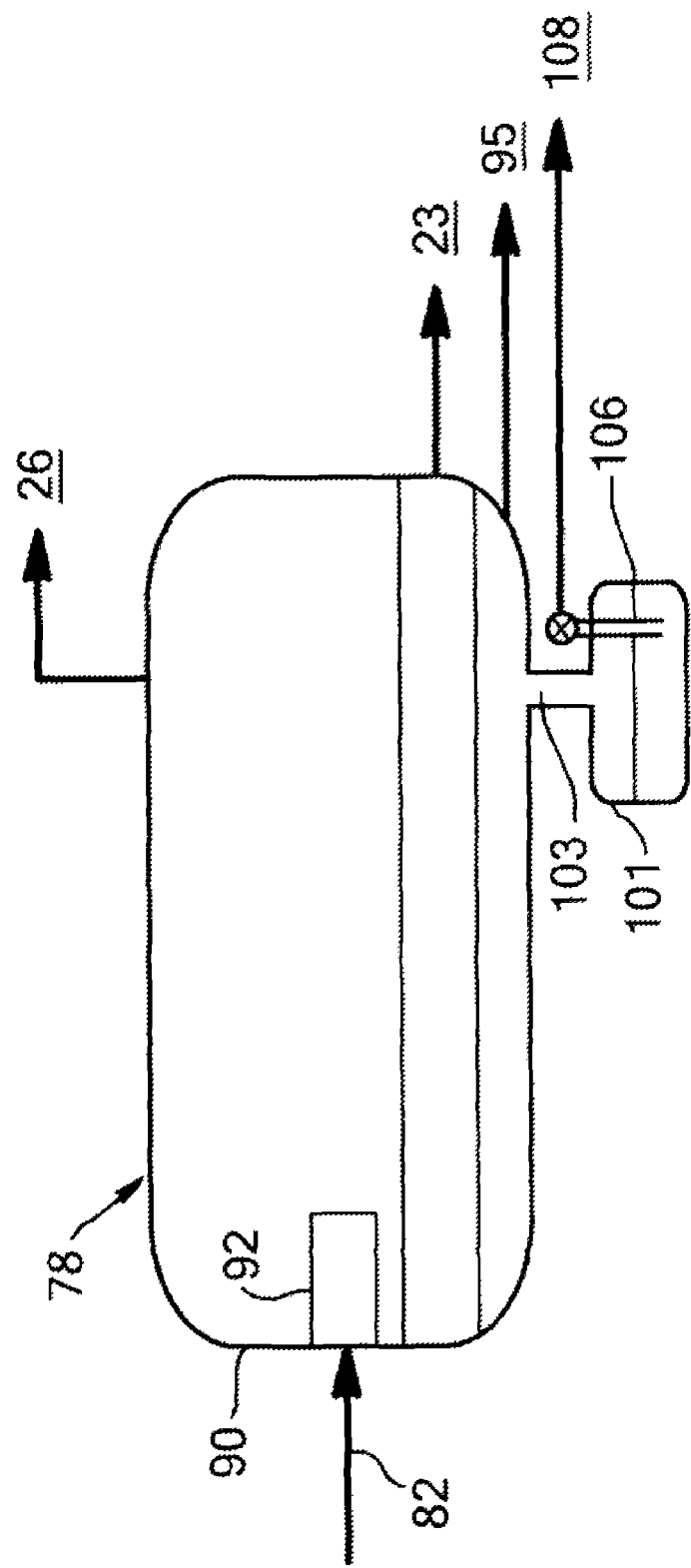
FIG. 3 shows a Low Temperature Separator with mercury draw-off unit.

A particular advantageous embodiment of a LTS will now be discussed with reference to FIG. 3. The LTS 78 comprises a gravity settling tank 90 having an inlet 92 for receiving the gas from line 82, and outlets for gas 26, condensate 23 and glycol 95 arranged to draw off fluid at different heights in the tank 90 where the respective phases are present after gravity settling. The glycol can be recycled to the glycol unit 74. The tank further comprises a mercury draw-off unit 101 having an inlet 103 at a low point in the tank, preferably the lowest point. Due to its specific weight, mercury and mercury components will settle and concentrate in the mercury draw-off unit 101. When after some time, e.g. after operation for weeks, months, or even 1, 2, or 3 years, e.g. in the range of 1-12 times a year, mercury components have accumulated to a certain level 106 in the unit 101, they are drawn off via the outlet 108 that is connected to a standpipe.

The mercury concentration in the gas 26 is predominantly determined by the temperature in the low temperature separator. Typically, operating the separator at −20 degrees C., the mercury concentration is in the order of 10-15 µg/Nm³.

Returning now to the discussion of FIG. 2, condensate obtained from the LTS 78 is sent via line 23 to the condensate workup section 29.

The pressure in line 30 is typically large enough to provide the trans-membrane pressure needed for the membrane separation, so that no compression upstream of the membrane separation unit is needed. The trans-membrane pressure can be controlled by a back-pressure valve 85. The pressure in line 35 will typically be above atmospheric, such as between 5 and 30 bar, and the membrane unit has to be designed for such downstream and the corresponding upstream pressures.

Since in this embodiment non-stabilized condensate is passed through the membrane separation unit 28, some flashing possibly occurs at the transition to the lower pressure at the permeate side, so that gas can be formed in particular at the permeate side. For that reason it can be advantageous to arrange a gas-liquid separator in line 35 or as an upstream part of the condensate stabilizer section. Gas separated therein is mercury-free and can e.g. be combined with stream 45, or used as fuel gas. In another embodiment, the membrane separation unit 28 may be located downstream from the condensate stabilizer section 40.

The mercury-rich and predominantly liquid retentate 39 that is removed from the nanofiltration membrane separation unit 28 is sent in this example upstream and recycled via the inlet separation system 7. As shown in FIG. 2, retentate can be combined with the inlet stream to the three-phase separator 63, but could also be recycled to upstream of the slug catcher 60. By allowing the retentate to undergo a further gas/liquid separation together with another process stream, part of the mercury components concentrated in the retentate will be sent with the gas stream 10 to the gas treating system 18, where mercury is removed from the gas stream to specifications in the LTS 78. During normal operation under constant process conditions an equilibrium mercury concentration is expected to form in the condensate workup section between the inlet separator 63 and the feed side of the membrane separation unit 28. In this way, all mercury components can be removed at one point in the gas processing plant 51, LTS 78. Another advantage of the plant 51 is that due to the arrangement of the membrane separation unit 28 upstream of the condensate stabilizer section 40, the feed to the condensate stabilizer section is mercury-free, so that the stabilizer section is prevented from corrosion due to mercury contaminants.

Figure 4:
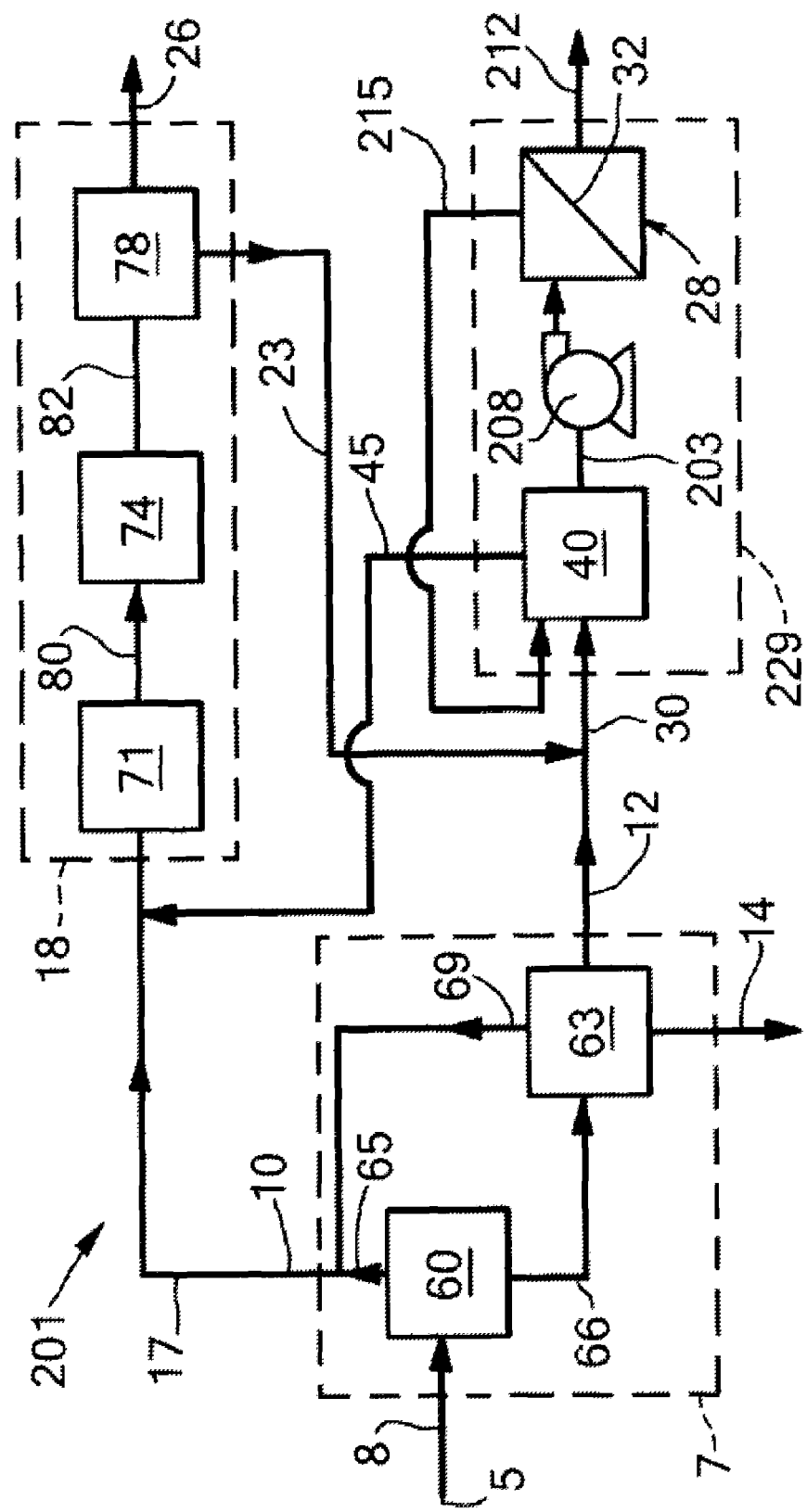
FIG. 4 shows schematically a further embodiment of the invention.

Reference is now made to FIG. 4, showing a further embodiment of a gas plant 201 in accordance with the present invention. The main difference with the embodiment of FIG. 3 is that the sequence of the membrane separation unit 28 and the condensate stabilizer section 40 in the condensate workup section 229 is interchanged. Up to the condensate stabilizer section 40 the plant 201 can be regarded as conventional gas processing plant. The feed to the condensate stabilizer section 40 contains mercury, and so do the gas sent to the gas treating unit via line 45 and the stabilized condensate in line 203. Downstream of the stabilizer section the stabilized condensate in line 203 is typically at low or atmospheric pressure. In order to provide the trans-membrane pressure needed to operate the membrane separation unit 28, a compressor pressure pump 208 is provided. Since stabilized condensate is fed to the membrane separation unit, no significant flashing will occur during membrane separation.

Mercury-depleted permeate from the membrane separation unit is discharged via line 212. Mercury-enriched retentate can be sent back to the inlet separator as shown and discussed with reference to FIG. 2. FIG. 4 shows another option, namely recycling the retentate via line 215 to the condensate stabilizer section. This can be an interesting option when the condensate stabilizer section contains a sufficiently large settling tank, in which mercury components can concentrate at the bottom, so that they can be removed using a mercury removal unit of the tank, e.g. similar to the one discussed with reference to FIG. 3.

It is well known to prepare lower olefins by means of a steam cracking process from a contaminated feedstock as described in WO-A-9927036. The naphtha crackers and ethylene crackers used in the steam cracking process require relatively low mercury content in order to function properly. Therefore the mercury-depleted natural gas condensate obtained via the present invention may be suitably used as cracker feedstock in such applications.

Figure 5:
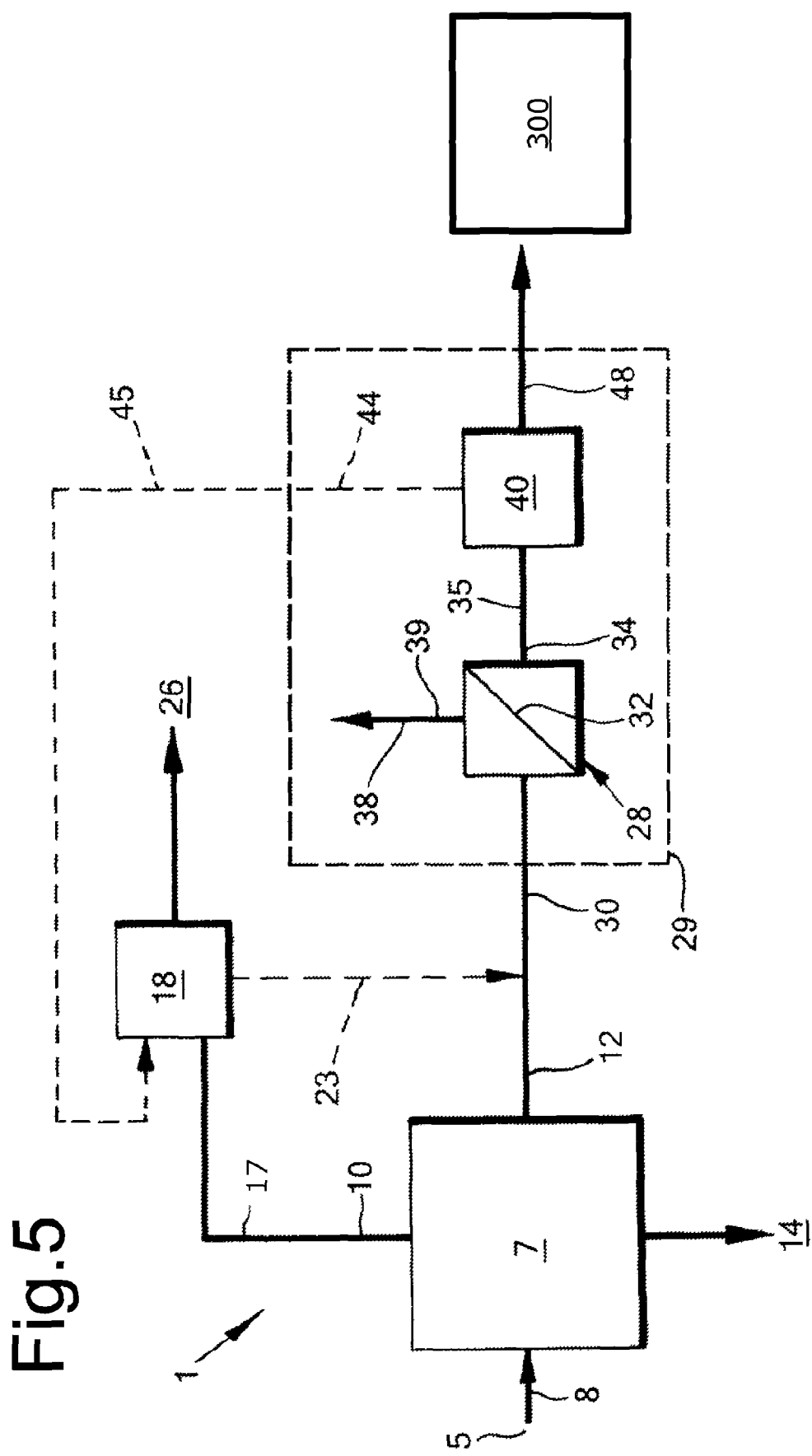
FIG. 5 shows schematically a further embodiment of the invention.

In some embodiments of the present inventions additional methods may be employed to further reduce the mercury content of the permeate discharged from the membrane separation unit. As shown in FIG. 5, the mercury content of the mercury-depleted natural gas condensate may be further reduced by installing a mercury guard bed 300 after line 212. The mercury-depleted natural gas condensate obtained at the permeate side of the membrane is then processed through the guard bed obtain a condensate with a further reduced mercury content. Such a condensate may suitably be used as feedstock for lower olefin manufacturing. Alternatively guard bed 300 may simply be used as a further method to remove any traces of mercury which may have passed through the membrane separation unit.

In FIG. 5, the mercury guard bed is shown as an element in the embodiment from FIG. 1; however, a mercury guard bed element could also be added to the embodiments from FIGS. 2 and 4 incorporated downstream of the membrane separation unit. The mercury guard bed may comprise any absorbent material which captures mercury including but not limited to alumina or active carbon, impregnated with $KI_3$, or a metal sulphide such as CuS, ZnS or a mixture thereof.

EXAMPLES

Membrane separation tests were carried out for three liquid condensates from different sources (sample designations S, N, and D). The membrane separation unit that was used in these tests was built from glass in order to prevent mercury adsorption on metal, which could otherwise have disturbed the mass balance in the tests. It will be understood that in general a suitable membrane separation unit can contain metal parts. The membrane separation unit was provided with $9.6 \cdot 10^{-4}$ m$^2$ of a PDMS/PAN membrane as obtained from GKSS Forschungszentrum GmbH (a research institute having its principal office in Geesthacht, Germany), and commercially available from GMT Membrantechnik GmbH (a company having its principle office in Rheinfelden, Germany). The membrane comprised a top layer of cross-linked PolyDiMethylSiloxane (PDMS) and a supporting layer of a PolyAcryloNitrile (PAN).

In each of the tests, condensate was fed for several hours into the dead-end membrane cell. The flux, pressure, run time and stage cut are given in Table 1. The separation was carried out at ambient temperature. The mass balance in each case was between 95 and 97%.

TABLE 1

|  | S | N | D |
|---|---|---|---|
| flux (kg/m2/bar/hr) | 1.4 | 1.7 | 2.0 |
| pressure (bar) | 11.5 | 12 | 11.5 |
| run time (hr) | 2.8 | 6.9 | 7.5 |
| stage cut (%) | 23 | 74 | 92 |
| total mercury concentration feed (µg/l) | 2000 | 430 | 1800 |
| total mercury concentration permeate (µg/l) | <25 | 26 | <25 |
| total mercury concentration retentate (µg/l) | 2200 | 1200 | 10000 |

The table also shows the mercury concentration that was measured for the feed, permeate and retentate in each test. Mercury determination was done using European Standard Method for mercury in liquids EN 1483-1997 Water quality—Determination of mercury. In the method a hot destruction at 95 degrees Celsius is performed in an acid environment ($H_2SO_4$, $HNO_3$) with potassium permanganate and potassium peroxodisulphate. Mercury detection is done using a flame less atomic absorption with UV lamp. The mercury is reduced with stannum chloride to mercury vapour and measured at 253.7 nm.

The condensate S was a sour condensate, so is expected to contain mercury at least partially in the form of mercury sulphide. The condensates N and D were sweet condensates, and mercury in these is expected to be predominantly present in metallic/ionic form, perhaps together with some alkyl mercury. The sweet condensates have a density of 720-770 kg/dm$^3$ and a boiling point range of 35-350 degree C.

In another example, condensate was fed for several hours into a membrane cell comprising a top layer of cross-linked PolyDiMethylSiloxane (PDMS) and a supporting layer of a PolyAcryloNitrile (PAN) at 3 m$^3$/hour. The total mercury concentration of the feed was approximately 3000 ppb (parts per billion by weight). Table 2 displays the other process data for this experiment.

TABLE 2

| Recycle flow | 30 m$^3$/hour |
|---|---|
| Feed pressure | 10 bar |
| Recovery | 30% |
| Temperature | 25° C. |
| Resulting permeate flow | 1 nm$^3$/m$^2$/day |

For this test, the resulting mercury analysis resulted in a condensate with 0.5 ppb mercury.

As can be seen in all cases, mercury was essentially completely removed in the permeate. The retentate was enriched in mercury.

That which is claimed is:

1. A method for reducing the mercury content of natural gas condensate, the method consisting essentially of the steps of:
   passing a natural gas stream to a separation system for separating the natural gas stream into a liquid natural gas condensate and a gaseous stream, wherein the liquid natural gas condensate comprises a concentration of a mercury component selected from the group consisting of metallic mercury, ionic mercury, alkyl mercury, and mercury sulphide, wherein the concentration of the mercury component in the liquid natural gas condensate is in the range of from 1 ppbw to 5 ppmw;

passing the mercury component-containing liquid natural gas condensate to either a polymeric or ceramic nanofiltration membrane having a feed side and a permeate side, wherein the nanofiltration membrane has an average membrane pore size of less than 3 nm;

contacting the liquid natural gas condensate with the feed side of the polymeric or ceramic nanofiltration membrane that provides for obtaining a mercury-enriched retentate at the feed side of the membrane and a mercury-depleted natural gas condensate at the permeate side of the membrane, wherein at least 80 wt % of the group of mercury components is removed from the liquid natural gas condensate; and recycling the mercury-enriched retentate to the separation system.

2. The method according to claim 1, wherein the nanofiltration membrane is a polymeric nanofiltration membrane comprising a cross-linked polysiloxane layer.

3. The method according to claim 2, further comprising processing: the mercury-depleted natural gas condensate through a mercury guard bed, comprising an absorbent material for capturing mercury from the mercury-depleted natural gas condensate, wherein the absorbent material is selected from the group consisting of alumina, active carbon impregnated with $KI_3$, copper and zinc sulphide, to obtain a condensate with a further reduced mercury content.

4. The method of claim 3, further comprising: using the mercury-depleted natural gas condensate as feedstock to a steam cracking process for lower olefin manufacturing.

5. The method according to claim 2, wherein the nanofiltration membrane is operated with a stage cut in the range of from 10 to 99%.

6. The method according to claim 5, wherein the permeate flux through the nanofiltration membrane is in the range of from 4 to 1000 $l/h/m^2$.

7. The method according to claim 6, wherein the pressure difference across the nanofiltration membrane is in the range of from 1 to 60 bar.

8. The method according to claim 7, wherein the membrane operating temperature is in the range of from 10 to 100° C.

9. The method according to claim 2, wherein the cross-linked polysiloxane layer is supported on a base layer of polyacrylonitrile.

10. The method according to claim 2, wherein the polymeric nanofiltration membrane has a top layer of cross-linked polydimethylsiloxane and a supporting layer of polyacrylonitrile.

11. The method according to claim 1, further comprising: using the mercury-depleted natural gas condensate as feedstock to a steam cracking process for lower olefin manufacturing.

12. The method according to claim 1, wherein the nanofiltration membrane is a ceramic nanofiltration membrane selected from the group consisting of mesoporous titania, mesoporous gamma-alumina, mesoporous zirconia and mesoporous silica.

13. A natural gas processing plant, consisting essentially of:
a separation system for separating the natural gas stream into a liquid natural gas condensate and a gaseous stream having a concentration of mercury;
a condensate workup section including either a polymeric or a ceramic nanofiltration membrane separation unit for reducing the mercury content of the liquid natural gas condensate and having a feed side and a permeate side, wherein the nanofiltration membrane has an average membrane pore size of less than 3 nm, and wherein the feed side provides for receiving the liquid natural gas condensate and discharging a mercury-enriched retentate, and wherein the permeate side provides for receiving and discharging a mercury-depleted natural gas condensate; and
a recycle conduit fluidly connected between the feed side and the separation system for recycling the mercury.

14. The natural gas processing plant according to claim 13, wherein the nanofiltration membrane is a polymeric nanofiltration membrane comprising a cross-linked polysiloxane layer.

15. The natural gas processing plant according to claim 13, further comprising: a mercury guard bed for removing mercury from the mercury-depleted natural gas condensate that is fluidly connected with the permeate side and providing for capture of mercury from the mercury depleted natural gas condensate.

16. The natural gas processing plant according to claim 15, wherein the mercury guard bed comprises an absorbent material, selected from the group consisting of alumina, active carbon impregnated with $KI_3$, and a metal sulphide, providing for capturing mercury from the mercury depleted natural gas condensate.

17. The natural gas processing plant according to claim 13, further comprising a condensate stabilizing section, wherein the mercury-enriched retentate is recycled to said condensate stabilizer section.

* * * * *